(12) United States Patent
Tanaami et al.

(10) Patent No.: US 12,036,460 B2
(45) Date of Patent: Jul. 16, 2024

(54) INFORMATION PROCESSING DEVICE, INFORMATION PROCESSING METHOD, AND PROGRAM

(71) Applicant: SINTOKOGIO, LTD., Nagoya (JP)

(72) Inventors: Yoshikane Tanaami, Nagoya (JP); Takahiro Kokawaji, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 17/705,719

(22) Filed: Mar. 28, 2022

(65) Prior Publication Data
US 2022/0314091 A1    Oct. 6, 2022

(30) Foreign Application Priority Data

Mar. 30, 2021 (JP) .................... 2021-058359

(51) Int. Cl.
 *A63B 69/00* (2006.01)
 *A63B 24/00* (2006.01)
 *A63B 71/06* (2006.01)

(52) U.S. Cl.
 CPC ...... *A63B 69/0002* (2013.01); *A63B 24/0006* (2013.01); *A63B 69/0075* (2013.01);
 (Continued)

(58) Field of Classification Search
 CPC ............ A63B 69/0002; A63B 24/0006; A63B 69/0075; A63B 71/0622; A63B 2024/0015; A63B 2069/0008; A63B 2071/0625; A63B 2071/0694; A63B 2220/05; A63B 2220/62; A63B 2220/803; A63B 2230/62; A63B 24/0075; A63B 2024/0012;
 (Continued)

(56) References Cited

U.S. PATENT DOCUMENTS 4,577,863 A * 3/1986 Ito ...................... A63B 69/0002
434/247
4,577,868 A * 3/1986 Kiyonaga .......... A63B 69/3667
473/452

(Continued)

FOREIGN PATENT DOCUMENTS

JP  2019-217275 A  12/2019
WO  WO-9616706 A1 * 6/1996 ......... A63B 24/0003

*Primary Examiner* — Nini F Legesse
(74) *Attorney, Agent, or Firm* — Harness, Dickey & Pierce, P.L.C.

(57) ABSTRACT

Provided is a technique with which a batter who is practicing batting with a tee can acknowledge how the batter should change his/her hitting posture. An information processing device includes a processor that executes: (a) continuously measuring, according to either or both of output signals from a motion sensor and a force plate, a posture of a batter who is practicing batting with a tee; (b) determining, according to an output signal from a force sensor internally stored in the tee, a timing at which the batter hits a ball placed at the tee; (c) determining, as a hitting posture of the batter, a posture of the batter at the determined timing; and (d) outputting a message instructing the batter to change the batter's hitting posture, according to information indicating an exemplary hitting posture and information indicating the determined batter's hitting posture.

7 Claims, 11 Drawing Sheets

(52) U.S. Cl.
CPC .. *A63B 71/0622* (2013.01); *A63B 2024/0015* (2013.01); *A63B 2069/0008* (2013.01); *A63B 2071/0625* (2013.01); *A63B 2071/0694* (2013.01); *A63B 2220/05* (2013.01); *A63B 2220/62* (2013.01); *A63B 2220/803* (2013.01); *A63B 2230/62* (2013.01)

(58) Field of Classification Search
CPC .......... A63B 2220/51; A63B 2220/833; G06T 2207/30196; G06T 2207/30204; G06T 2207/30221; G06T 7/246; G06T 7/20; G06T 7/70; G06V 40/23; G06V 10/74; G06V 10/7788; G06N 20/00
USPC ................................ 473/417, 131, 269, 409
See application file for complete search history.

(56) References Cited

U.S. PATENT DOCUMENTS

| | | | | |
|---|---|---|---|---|
| 5,984,810 | A * | 11/1999 | Frye | A63B 69/0002 473/422 |
| 11,458,362 | B1 * | 10/2022 | Berme | G09B 19/0038 |
| 2005/0215337 | A1 * | 9/2005 | Shirai | G06T 7/20 473/151 |
| 2011/0267344 | A1 * | 11/2011 | Germann | G06V 20/64 382/154 |
| 2014/0334670 | A1 * | 11/2014 | Guigues | G06V 40/23 382/103 |
| 2017/0014698 | A1 | 1/2017 | Dilz, Jr. | |
| 2017/0304702 | A1 | 10/2017 | Dilz, Jr. | |
| 2018/0290037 | A1 | 10/2018 | Dilz, Jr. | |
| 2020/0054248 | A1 * | 2/2020 | Wu | A61B 5/1038 |

* cited by examiner

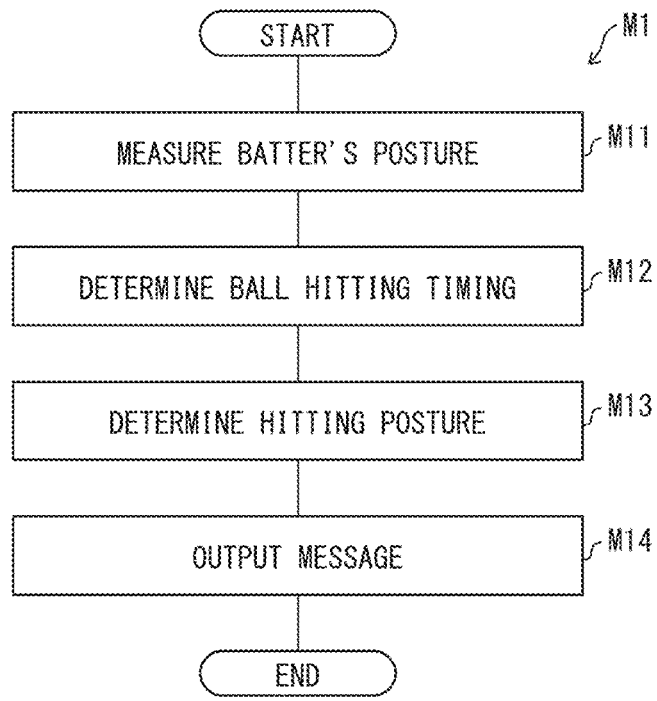
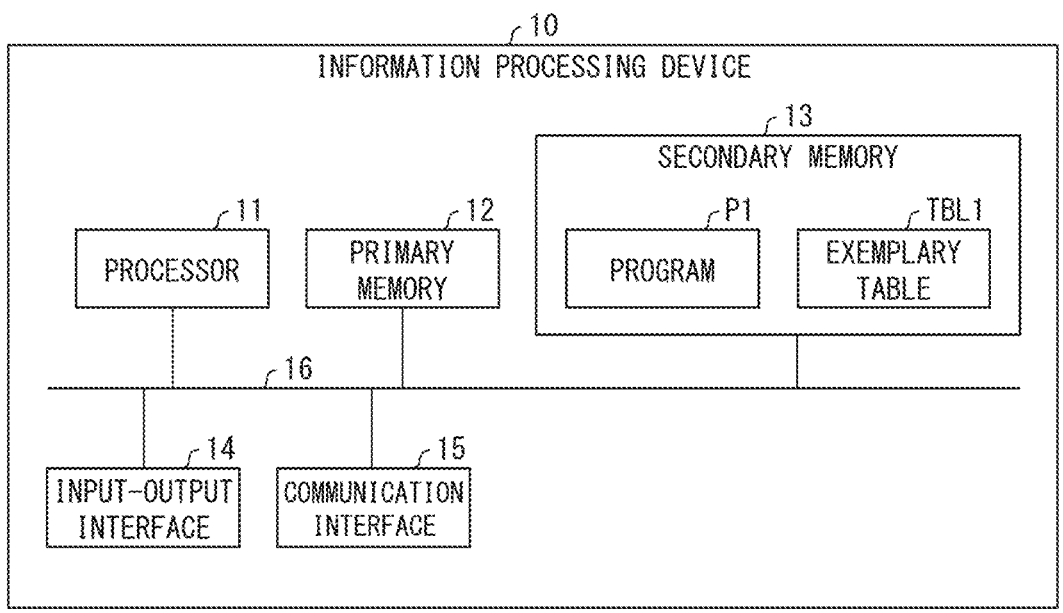

| PHYSICAL CHARACTERISTIC | EXEMPLARY POSTURE |
|---|---|
| CHARACTERISTIC 01 | Pattern01 |
| CHARACTERISTIC 02 | Pattern02 |
| CHARACTERISTIC 03 | Pattern03 |
| ⋮ | ⋮ |

FIG. 12

| EXEMPLARY POSTURE | EVALUATION TARGET POSTURE | MESSAGE |
|---|---|---|
| Pattern01 | Posture01 | message11 |
| | Posture02 | message12 |
| | Posture03 | message13 |
| | ⋮ | ⋮ |
| Pattern02 | Posture01 | message21 |
| | Posture02 | message22 |
| | Posture03 | message23 |
| | ⋮ | ⋮ |
| ⋮ | ⋮ | ⋮ |

FIG. 13

| DIFFERENCE INFORMATION | MESSAGE |
|---|---|
| Diff pattern 01 | message01 |
| Diff pattern 02 | message02 |
| Diff pattern 03 | message03 |
| ⋮ | ⋮ |

INFORMATION PROCESSING DEVICE, INFORMATION PROCESSING METHOD, AND PROGRAM

This Nonprovisional application claims priority under 35 U.S.C. § 119 on Patent Application No. 2021-058359 filed in Japan on Mar. 30, 2021, the entire contents of which are hereby incorporated by reference.

TECHNICAL FIELD

The present invention relates to an information processing device, an information processing method, and a program.

BACKGROUND ART

Patent Literature 1 discloses a system in which a batting tee is provided with a bat speed radar device and a ball hitting speed radar device so that a bat speed and a ball speed are detected.

CITATION LIST

Patent Literature

Patent Literature 1
Japanese Patent Application Publication, Tokukai, No. 2019-217275

SUMMARY OF INVENTION

Technical Problem

The conventional technique such as that described above can measure movement information of a bat and/or a ball and an exercise energy of a player. However, with such a conventional technique, a batter who is practicing batting with a tee cannot acknowledge how he/she should change his/her hitting posture.

An aspect of the present invention has an object to provide a technique with which a batter who is practicing batting with a tee can acknowledge how he/she should change his/her hitting posture.

Solution to Problem

In order to attain the above object, an information processing device in accordance with an aspect of the present invention includes one or more processors. The one or more processors execute the following steps (1) to (4):
(1) A measuring step of continuously measuring, in accordance with either or both of an output signal from a motion sensor and an output signal from a force plate, a posture of a batter who is practicing batting with a tee.
(2) A timing determining step of determining, in accordance with an output signal from a force sensor internally stored in the tee, a timing at which the batter hits a ball placed at the tee.
(3) A posture determining step of determining, as a hitting posture of the batter, a posture of the batter at the timing determined in the timing determining step.
(4) An output step of outputting a message instructing the batter to change the hitting posture of the batter, in accordance with information indicating an exemplary hitting posture corresponding to a physical characteristic of the batter and with information indicating the hitting posture of the batter determined in the posture determining step.

Advantageous Effects of Invention

In accordance with an aspect of the present invention, a batter who is practicing batting with a tee can acknowledge how he/she should change his/her hitting posture.

BRIEF DESCRIPTION OF DRAWINGS

FIG. 3 shows a flowchart illustrating a flow of an information processing method in accordance with Embodiment 1 of the present invention.

FIG. 4 shows a block diagram illustrating a configuration of an information processing device in accordance with Embodiment 1 of the present invention.

FIG. 12 shows one example of a content of a message table in accordance with Embodiment 3 of the present invention.

FIG. 13 shows one example of a content of a message table in accordance with Embodiment 4 of the present invention.

DESCRIPTION OF EMBODIMENTS

Embodiment 1

(Outline of System)

Figure 1:
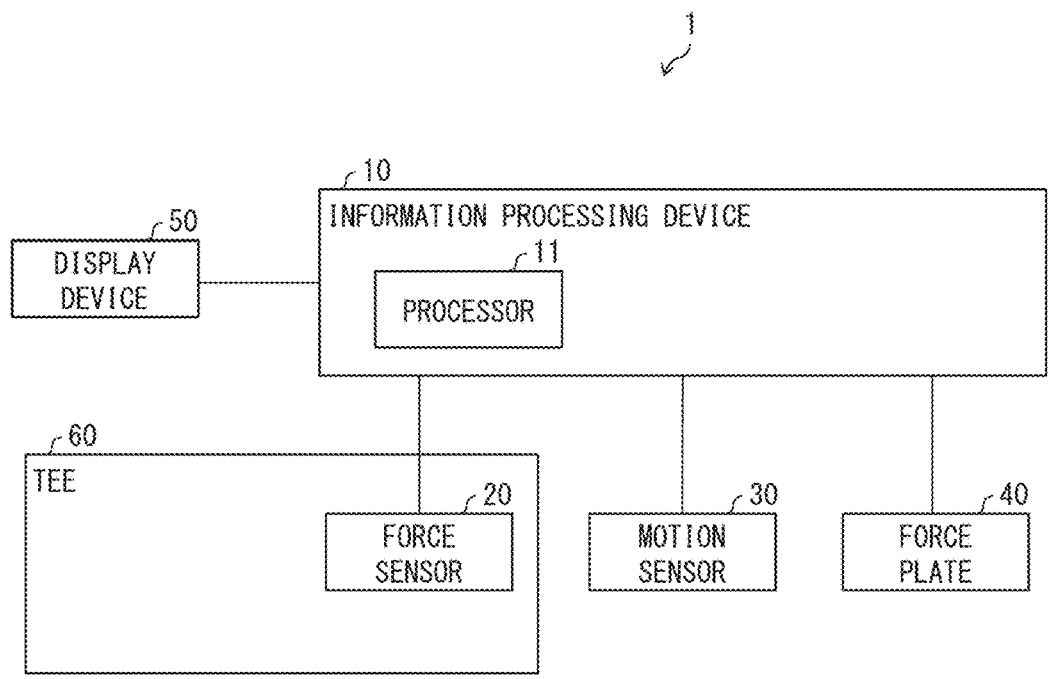
FIG. 1 shows a block diagram schematically illustrating a configuration of a batting system in accordance with Embodiment 1 of the present invention.
Figure 2:
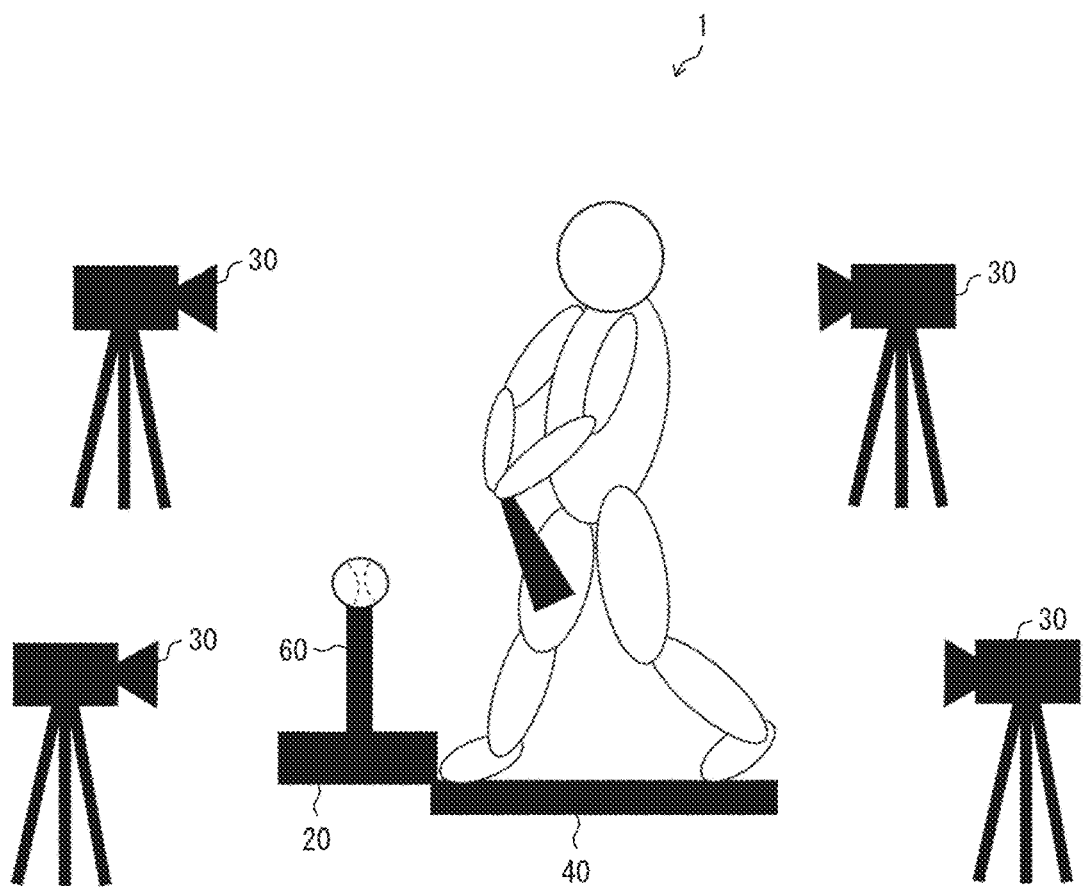
FIG. 2 schematically shows an appearance of the batting system in accordance with Embodiment 1 of the present invention.

The following description will discuss an embodiment of the present invention. FIG. 1 shows a block diagram schematically illustrating a configuration of a batting system 1 in accordance with Embodiment 1 of the present invention, and FIG. 2 shows a view schematically illustrating an appearance of the batting system 1. The batting system 1 is a system that outputs a message instructing a batter who is practicing batting with a tee to change his/her hitting posture. The batting system 1 includes an information processing device 10, a force sensor 20, a motion sensor 30, a force plate 40, and a tee 60.

The information processing device 10 is a device that executes various calculations to output a message instructing a batter who is practicing batting with a tee to change his/her hitting posture. The information processing device 10 may be a personal computer, for example.

The force sensor 20 is a sensor internally stored in the tee 60 at which a ball is placed. The force sensor 20 detects directions and magnitudes of a force and a torque. In an example, the force sensor 20 is a six-axis force sensor that detects, in a three-dimensional space defined by an x-axis, a y-axis, and a z-axis, force components Fx, Fy, and Fz in an x-axis direction, a y-axis direction, and a z-axis direction and torque components Mx, My, and Mz in the x-axis direction, y-axis direction, and z-axis direction. Note that the force sensor 20 is not limited to the six-axis force sensor. For example, alternatively, the force sensor 20 may be another type of force sensor, such as a four-axis force sensor.

The motion sensor 30 is a sensor that measures the posture of the batter by a motion capture technique. In an example, the motion sensor 30 is a motion capture camera that detects plural markers attached to the batter. In the example shown in FIG. 2, the batting system 1 includes four motion sensors 30. The number of motion sensors 30 may be more than four or less than four.

The force plate 40 is placed on a floor surface on which the batter performs a batting motion. The force plate detects a floor reaction force and a gravity center position of the batter.

The information processing device 10 includes a processor 11. The processor 11 executes an information processing method M1. FIG. 3 shows a flowchart illustrating a flow of the information processing method M1 to be executed by the processor 11. The information processing method M1 includes a measuring step M11, a timing determining step M12, a posture determining step M13, and an output step M14.

The measuring step M11 is a step of continuously measuring, in accordance with either or both of an output signal from the motion sensor 30 and an output signal from the force plate 40, the posture of the batter who is practicing batting with the tee. In an example, the processor 11 continuously measures the posture of the batter by the motion capture technique in accordance with an output signal from the motion sensor 30. In an example, the processor 11 continuously measures the gravity center position of the batter in accordance with an output signal from the force plate 40.

In an example, the information indicating the posture of the batter includes a part or all of angles of a shoulder joint, an elbow joint, a hip joint, and a knee joint of the batter and the gravity center position of the batter. In other words, the processor 11 calculates a part or all of the angles of the shoulder joint, the elbow joint, the hip joint, and the knee joint of the batter and the gravity center position of the batter in accordance with either or both of the output signal from the motion sensor 30 and the output signal from the force plate 40.

The timing determining step M12 is a step of determining, in accordance with an output signal from the force sensor 20 internally stored in the tee 60, a timing at which the batter hits the ball placed at the tee 60. In an example, the processor 11 determines, in accordance with the output signal from the force sensor 20, that the batter hits the ball, if an amount of change in a force and/or a torque applied to the tee 60 exceeds a given threshold. The timing determined by the processor 11 in the timing determining step M12 will be referred to as a "ball hitting timing". Note that the method for determining the ball hitting timing is not limited to the above-described example. In an example, the processor 11 may determine, in accordance with the output signal from the force sensor 20, that the batter hits the ball, if a vertical force applied to the tee 60, i.e., a gravitation force of the ball becomes equal to or lower than the threshold.

The posture determining step M13 is a step of determining, as a hitting posture of the batter, the posture of the batter at the timing determined in the timing determining step M12.

The output step M14 is a step of outputting a message instructing the batter to change his/her hitting posture, in accordance with information indicating an exemplary hitting posture corresponding to a physical characteristic of the batter and with information indicating the batter's hitting posture determined in the posture determining step M13.

In the following description, the exemplary hitting posture may also be referred to as an "exemplary posture". The batter's hitting posture to be evaluated may also be referred to as an "evaluation target posture". In the following description, the information indicating the exemplary posture may also be simply referred to as an "exemplary posture". The information indicating the evaluation target posture may also be simply referred to as an "evaluation target posture".

One example of the information indicating the exemplary posture includes a part or all of the information that is detected by the motion sensor 30 and that indicates the positions of the plural markers attached to the batter, the angles of the shoulder joint, the elbow joint, the hip joint, and the knee joint of the batter and the gravity center position of the batter.

In an example, the information indicating the physical characteristic of the batter includes a part or all of the information indicating the height, the weight, the body mass index (BMI), the age, the sex, and the dominant hand of the batter and the batter's box (right-handed batter, left-handed batter) where the batter stands.

In an example, the information indicating the exemplary posture is stored in a given memory such as a secondary memory 13 in such a manner that the information indicating the exemplary posture is associated with the physical characteristic of the batter. In this case, pieces of information respectively indicating plural exemplary postures are stored in association with pieces of information indicating the physical characteristics of the batter. The pieces of information indicating the exemplary postures and the pieces of information indicating the physical characteristics may be associated with each other in a one-to-one relation. In another example, a single piece of information indicating a single exemplary posture may be associated with plural pieces of information indicating plural physical characteristics.

One example of the message instructing to change the hitting posture is a message indicating a difference between the exemplary posture and the evaluation target posture. Alternatively, the message may be a message indicating an improvement to be made in the evaluation target posture in accordance with the difference between the exemplary posture and the evaluation target posture. In an example, the message may be output as an image such as a still image or a moving image or as a sound.

With the above configuration, the information processing device 10 determines, in accordance with an output signal from the force sensor 20 internally stored in the tee, a timing at which the batter hits the ball and outputs a message instructing to change the hitting posture at the determined timing. Consequently, the batter who is practicing batting with the tee can acknowledge how he/she should change his/her hitting posture.

(System Configuration)

Next, the following description will discuss a configuration of the batting system 1 with reference to FIG. 1. As shown in FIG. 1, the batting system 1 includes a display device 50, in addition to the information processing device 10, the force sensor 20, the motion sensor 30, the force plate 40, and the tee 60.

(Configuration of Information Processing Device 10)

FIG. 4 shows a block diagram illustrating a configuration of the information processing device 10. The information processing device 10 includes the processor 11, a primary memory 12, the secondary memory 13, an input-output interface 14, a communication interface 15, and a bus 16. The processor 11, the primary memory 12, the secondary memory 13, the input-output interface 14, and the communication interface 15 are connected to one another through the bus 16.

The secondary memory 13 has a program P1 and an exemplary table TBL1 stored therein. The processor 11 loads, on the primary memory 12, the program P1 stored in the secondary memory 13, and executes the steps in the information processing method M1 in accordance with instructions in the program P1 loaded on the primary memory 12. A device that can be used as the processor 11 is, for example, a central processing unit (CPU). A device that can be used as the primary memory 12 is, for example, a semiconductor random access memory (RAM). A device that can be used as the secondary memory 13 is, for example, a flash memory.

The input-output interface 14 is connected with an input device and/or an output device. The input-output interface 14 is, for example, a universal serial bus (USB). Information obtained from the force sensor 20, the motion sensor 30, and the force plate 40 in the information processing method M1 is input to the information processing device 10 via the input-output interface 14. Information to be supplied to the batter in the information processing method M1 is output from the information processing device 10 via the input-output interface 14.

The communication interface 15 is an interface for communicating with other computers. Examples of the communication interface 15 may include an interface for communicating with other computers without using a network, such as a Bluetooth (registered trademark) interface. Examples of the communication interface 15 may also include an interface for communicating with other computers over a local area network (LAN), such as a Wi-Fi (registered trademark) interface.

Note that, although Embodiment 1 employs a configuration in which a single processor (processor 11) is used to execute the information processing method M1, the present invention is not limited to this. That is, the following configuration may be employed: plural processors are used to execute the information processing method M1. In this case, the plural processors which work together to execute the information processing method M1 may be provided in a single computer and may be configured to be communicable with one another via a bus. Alternatively, the plural processors may be provided in respective plural computers and may be configured to be communicable with one another over a network. For example, the following configuration can be employed: a processor contained in a computer constituting a cloud server and a processor contained in a computer owned by a user of the cloud server work together to execute the information processing method M1.

Figures 5, 6:
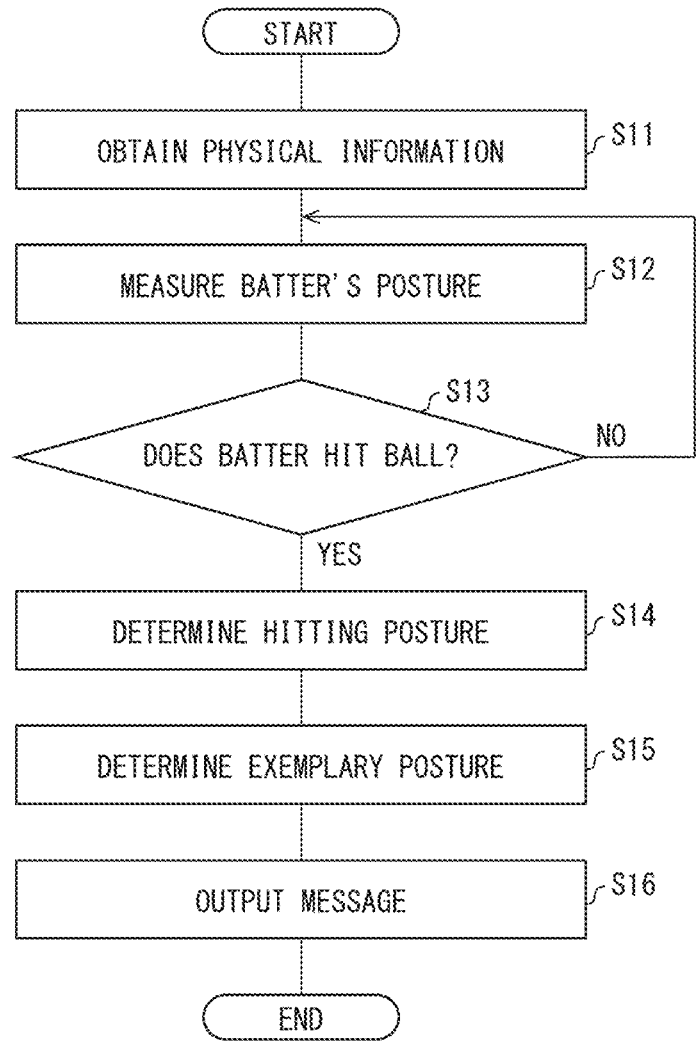
FIG. 5 shows an example of a content of an exemplary table in accordance with Embodiment 1 of the present invention.
FIG. 6 shows a flowchart illustrating one example of an operation carried out by the batting system in accordance with Embodiment 1 of the present invention.

The exemplary table TBL1 is a table in which the physical characteristics of the batter and the exemplary postures are associated with each other. FIG. 5 shows an example of a content of the exemplary table TBL1. The exemplary table TBL1 is a table in which the physical characteristics and the exemplary postures are associated with each other. In the example shown in FIG. 5, the exemplary table TBL1 contains the items "physical characteristic" and "exemplary posture" which are associated with each other. Out of these items, the item "physical characteristic" stores identification information used to identify the physical characteristic of the batter. The item "exemplary posture" stores identification information used to identify the exemplary posture, which is information indicating the exemplary posture. The exemplary table TBL1 is referred to by the processor 11 to execute a process for identifying an exemplary posture usable as a model to evaluate the batter's hitting posture to be evaluated.

The secondary memory 13 stores pieces of information indicating plural exemplary postures, and the plural exemplary postures are respectively provided with pieces of identification information. That is, by the pieces of identification information stored in the exemplary posture TBL1, the physical characteristics of the batter and the exemplary postures are associated with each other.

The display device 50 displays a screen in accordance with data supplied from the information processing device 10. In an example, the display device 50 is a liquid crystal display connected to the input-output interface 14 of the information processing device 10.

(Operation of Information Processing Device)

FIG. 6 shows a flowchart illustrating a flow of an information output operation to be executed by the processor 11 of the information processing device 10. In step S11, the processor 11 obtains physical information indicating the physical characteristic of the batter to be evaluated. In an example, the processor 11 may obtain the physical information input by the batter operating the input device such as a touch panel. In an example, the processor 11 may obtain the physical information by reading the physical information from a storage medium in which the physical information is stored. The physical information includes, for example, information indicating a part or all of the height, weight, BMI, age, and sex of the batter.

In step S12, the processor 11 continuously measures, in accordance with either or both of an output signal from the motion sensor 30 and an output signal from the force plate

40, the posture of the batter who is practicing batting with a tee. In an example, the posture of the batter to be measured by the processor 11 in step S12 includes a part or all of the angles of the shoulder joint, the elbow joint, the hip joint, and the knee joint of the batter and the gravity center position of the batter.

In step S13, the processor 11 determines whether or not the batter hits the ball placed at the tee 60, in accordance with the output signal from the force sensor 20. In an example, the processor 11 determines that the batter hits the ball, if an amount of change in a force and/or a torque applied to the tee 60 exceeds a given threshold, the amount of change being determined in accordance with the output signal from the force sensor 20. If it is determined that the batter hits the ball (step S13; YES), the processor 11 advances to a process in step S14. Meanwhile, if it is determined that the batter has not hit the ball yet (step S14; NO), the processor 11 returns to the process in step S12 to continue the process for measuring the posture of the batter.

The processor 11 repeatedly executes the process in step S12 until the batter hits the ball, so that the posture of the batter is continuously measured and the time-series information indicating the measured postures is accumulated in the secondary memory 13.

In step S14, the processor 11 determines, as the batter's hitting posture, the batter's posture measured at the timing determined in step S13.

In step S15, the processor 11 determines the exemplary posture corresponding to the physical characteristic of the batter. In an example, the processor 11 refers to the exemplary table TBL1 to determine the exemplary posture corresponding to the physical characteristic of the batter to be evaluated. If the physical characteristic of the batter thus obtained is not registered in the exemplary table TBL1, the processor 11 may select, from among the plural physical characteristics registered in the exemplary table TBL1, the one having a smallest difference from the physical characteristic obtained, and may determine the exemplary posture corresponding to the physical characteristic thus selected.

Note that the method for determining the exemplary posture in step S15 is not limited to the method in which the exemplary table TBL1 is referred to for making the determination, and may employ another method. The processor 11 may determine the exemplary posture by executing a process that is based on other rules involving use of the physical characteristic of the batter. In an example, the processor 11 may determine the exemplary posture by inputting the physical characteristic of the batter into a learned model constructed by machine learning in which the physical characteristic of the batter is an input and the label indicating the pattern of the exemplary posture is an output.

In step S16 shown in FIG. 6, the processor 11 outputs a message instructing the batter to change his/her hitting posture, in accordance with the information indicating the exemplary posture and with the information indicating the evaluation target posture of the batter. In an example, the processor 11 outputs a message indicating a difference between the exemplary posture and the evaluation target posture. In this example, the processor outputs the message by displaying, on the display device 50, an image indicating the message.

Figure 7:
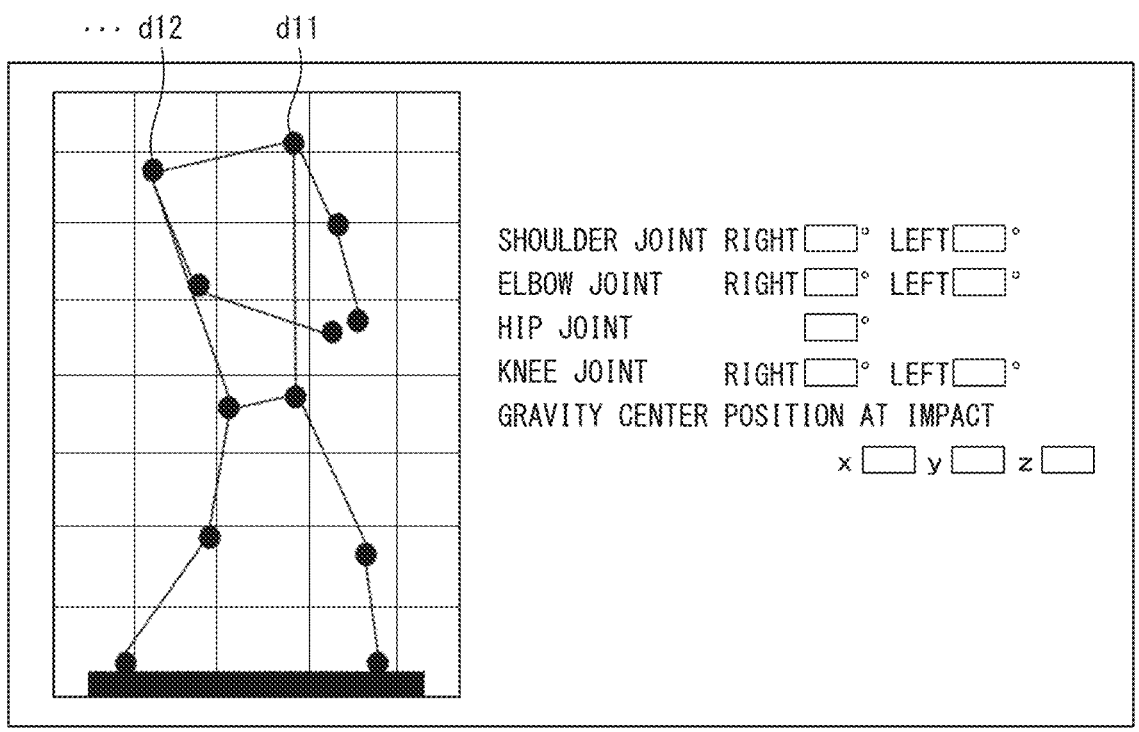
FIG. 7 shows one example of a screen to be displayed on a display device in accordance with Embodiment 1 of the present invention.
Figure 8:
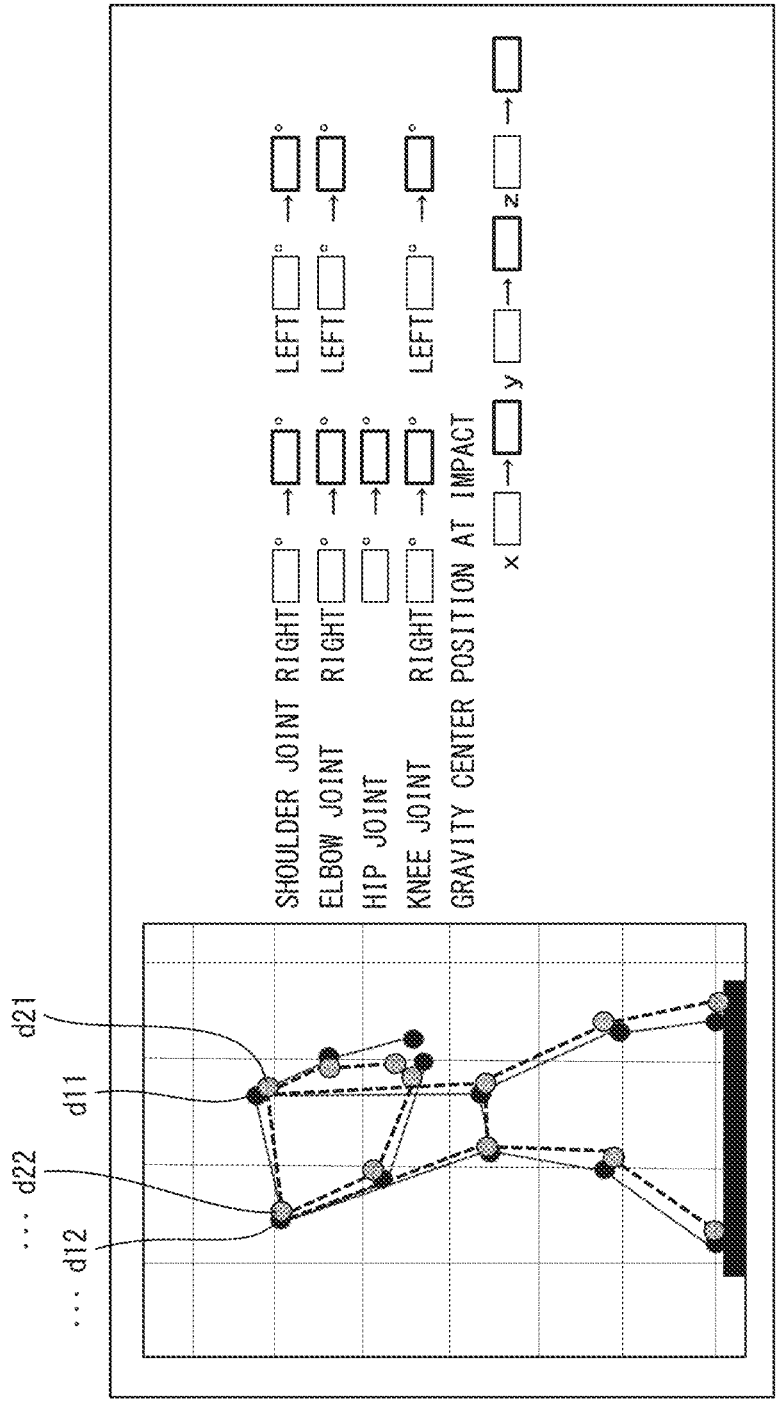
FIG. 8 shows one example of a screen to be displayed on the display device in accordance with Embodiment 1 of the present invention.

Each of FIGS. 7 and 8 shows one example of a screen to be displayed on the display device 50. FIG. 7 shows a screen indicating the evaluation target posture of the batter who is to be evaluated. The plural dots d11, d12, ... shown in FIG. 7 schematically show the appearance of the batter's posture measured by the processor 11 in accordance with the output signal from the motion sensor 30. The "SHOULDER JOINT", "ELBOW JOINT", "HIP JOINT", and "KNEE JOINT" in the screen shown in FIG. 7 respectively indicate the angle of the shoulder joint, the angle of the elbow joint, the angle of the hip joint, and the angle of the knee joint measured by the processor 11 in accordance with the output signal from the motion sensor 30. The "GRAVITY CENTER POSITION AT IMPACT" in the screen indicates the gravity center position of the batter measured by the processor 11 in accordance with the output signal from the force plate 40.

FIG. 8 shows a screen indicating differences between the exemplary posture and the evaluation target posture. The plural dots d21, d22, ... in FIG. 8 schematically show the appearance of the exemplary posture. In the example shown in FIG. 8, the differences between the exemplary posture and the evaluation target posture in terms of the shoulder joint, elbow joint, hip joint, knee joint, and gravity center position are displayed. The differences between the exemplary posture and the evaluation target posture are information indicating how the batter should change his/her hitting posture.

The method of how the processor 11 presents the differences between the exemplary posture and the evaluation target posture in the step S16 is not limited to the above-described method, and may employ another method. In an example, the processor 11 may change the content of the message to be output, in accordance with a combination of the exemplary posture and the evaluation target posture. In an example, instead of outputting the information indicating the difference between the exemplary posture and the evaluation target posture without any modification, the processor 11 may output the difference after modifying either or both of the exemplary posture and the evaluation target posture. For example, the processor 11 may output a difference smaller than the actual difference or a difference greater than the actual difference. In an example, if the difference between the exemplary posture and the evaluation target posture is greater than a given threshold, the processor 11 may output a message indicating a difference smaller than the actual difference.

In an example, in accordance with the physical characteristic of the batter, the processor 11 may change the message to be output. In an example, if the physical characteristic such as the age of the batter satisfies a given condition, the processor 11 may modify the exemplary posture so that the difference to be output becomes smaller than the actual difference. In an example, if the physical characteristic of the batter satisfies a given second condition, the processor 11 may modify the exemplary posture so that the difference to be output becomes greater than the actual difference.

In an example, for a given item among the plural items (e.g., the angle of the shoulder joint, the angle of the elbow joint, and the gravity center position) included in the information indicating the posture, the processor 11 may modify the exemplary posture so that the difference to be output becomes smaller than the actual difference. In an example, for a given item among the plural items included in the information indicating the posture, the processor 11 may modify the exemplary posture so that the difference to be output becomes greater than the actual difference. Thus, the processor 11 may modify the pieces of the information of the plural items included in the information indicating the posture, in accordance with the types of the items.

As described above, in accordance with Embodiment 1, the information processing device 10 outputs a message indicating a difference between the exemplary hitting posture and the batter's hitting posture. Consequently, the batter who is practicing batting with the tee can acknowledge how he/she should change his/her hitting posture.

In accordance with Embodiment 1, the information processing device 10 outputs a message instructing to change a part or all of the angles of the shoulder joint, the elbow joint, the hip joint, and the knee joint of the batter and the gravity center position to let the user know how the batter should change his/her hitting posture.

Consequently, the batter who uses the batting system 1 can acknowledge how he/she should change a part or all of the angles of the shoulder joint, the elbow joint, the hip joint, and the knee joint and the gravity center position.

Embodiment 2

The following description will discuss another embodiment of the present invention. For convenience of description, a member having a function identical to that of a member discussed in the embodiment above is given an identical reference sign, and a description thereof is omitted.

In Embodiment 2, a processor 11 of an information processing device 10 measures an impact strength and an impact angle in accordance with an output signal from a force sensor 20. That is, in Embodiment 2, the hitting posture of a batter includes an impact strength and an impact angle, in addition to angles of a shoulder joint, an elbow joint, a hip joint, and a knee joint of the batter and a gravity center position of the batter.

The impact strength means a magnitude of a force applied to a ball at a ball hitting timing. In an example, the processor 11 measures, as the impact strength, the magnitude of a force applied to a tee 60, in accordance with an output signal from the force sensor 20.

The impact angle means an angle of the force applied to the ball at the ball hitting timing. In an example, the processor 11 measures, as the impact angle, the angle of the force applied to the tee 60, in accordance with the output signal from the force sensor 20.

The items included in the information indicating the batter's hitting posture are not limited to those described above, and may include other item(s). In an example, the information indicating the hitting posture may include an initial speed of the ball at the ball hitting timing or an angle of the bat at the ball hitting timing.

In Embodiment 2, in a process (step S12 in FIG. 6) of measuring the posture of the batter, the processor 11 measures the impact strength and the impact angle in addition to the batter's shoulder joint, elbow joint, hip joint, knee joint, and gravity center position. In a process (step S16 in FIG. 6) of outputting a message, the processor 11 outputs a message how the batter should make changes in the impact strength and the impact angle, in addition to the batter's shoulder joint, elbow joint, hip joint, knee joint, and gravity center position.

Figure 9:
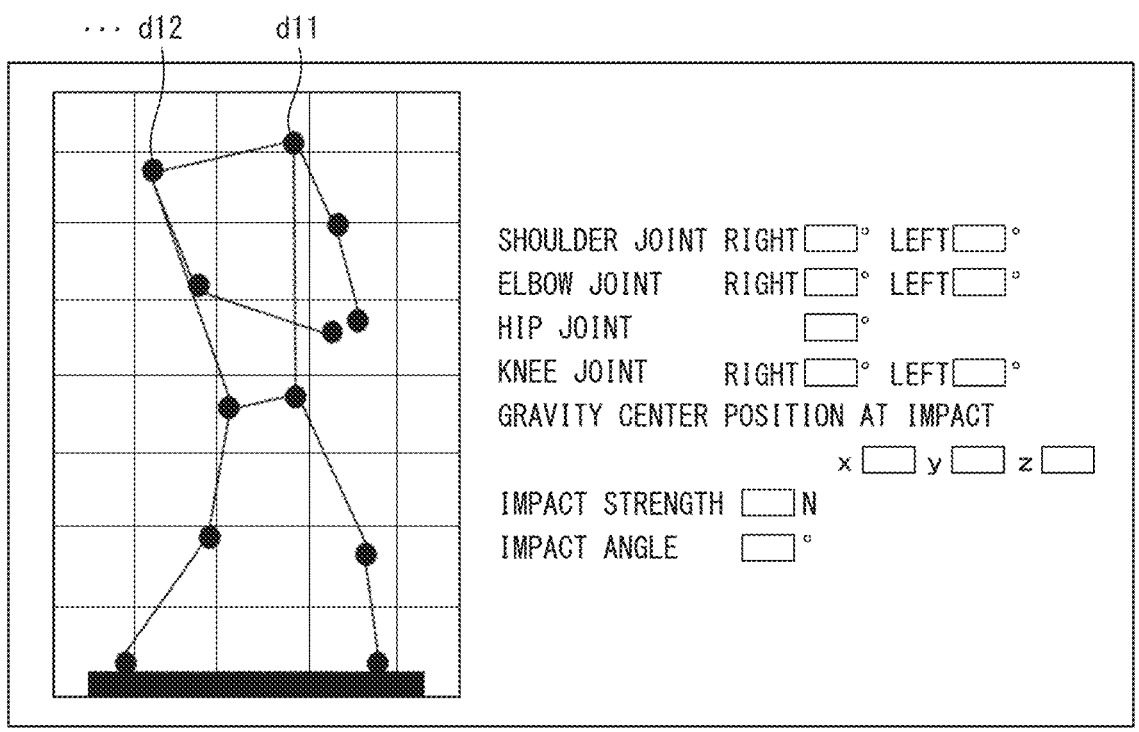
FIG. 9 shows one example of a screen to be displayed on a display device in accordance with Embodiment 2 of the present invention.
Figure 10:
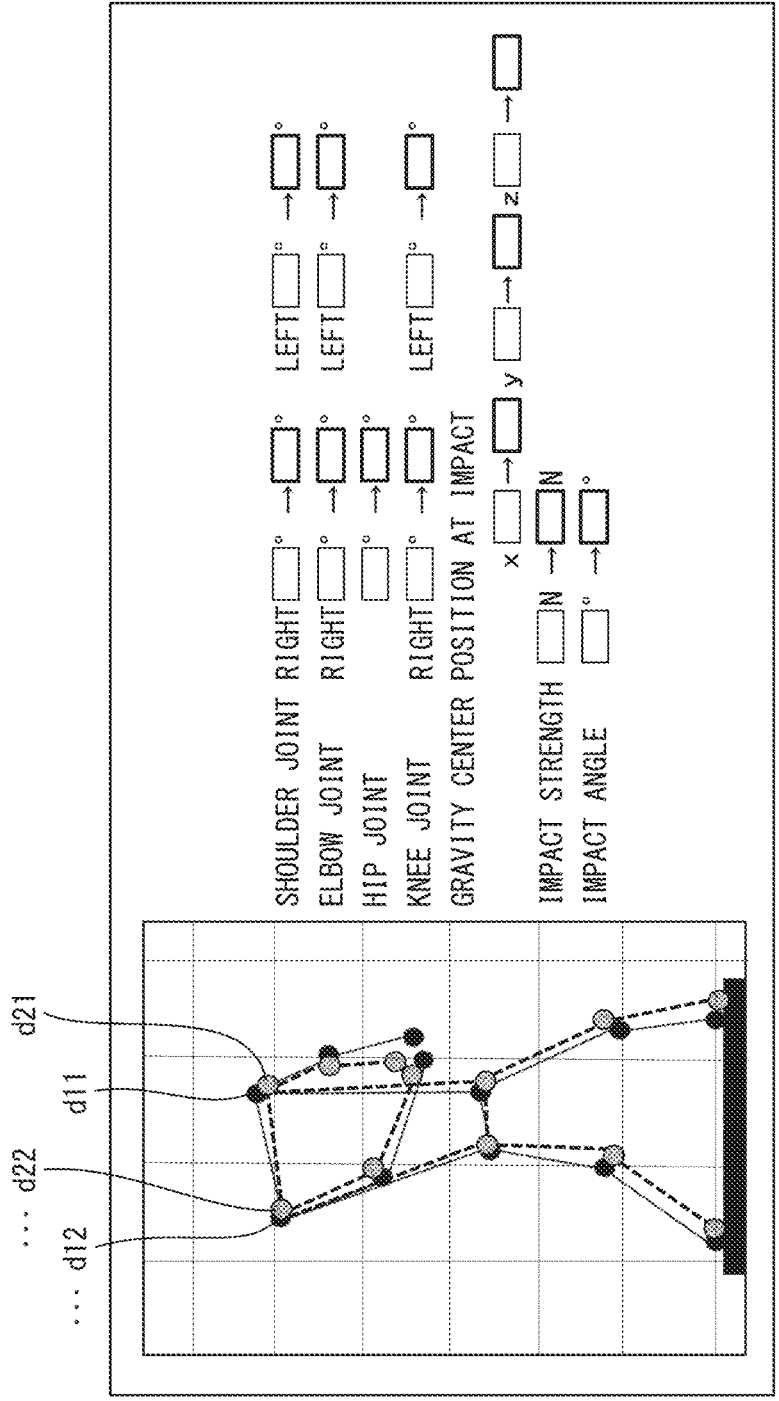
FIG. 10 shows one example of a screen to be displayed on the display device in accordance with Embodiment 2 of the present invention.

Each of FIGS. 9 and 10 shows one example of a screen to be displayed on a display device 50. In an example shown in FIG. 9, the "IMPACT STRENGTH" and "IMPACT ANGLE" are displayed, in addition to the angle of the shoulder joint of the batter, the angle of the elbow joint of the batter, and the like. The "IMPACT STRENGTH" and "IMPACT ANGLE" respectively indicate the impact strength and the impact angle measured by the processor 11 in accordance with the output signal from the force sensor 20.

FIG. 10 shows a screen indicating differences between the exemplary posture and the evaluation target posture. Displayed in the example shown in FIG. 10 are pieces of information indicating how the batter should make changes in the impact strength and the impact angle, in addition to the angles of the shoulder joint and the elbow joint and the like.

As described above, in accordance with Embodiment 2, the information processing device 10 presents the user the pieces of information indicating how the batter should make changes in the impact strength and the impact angle, in addition to the angles of the shoulder joint and the elbow joint and the like. By visually seeing the screen displayed on the display device 50, the batter who uses the batting system 1 can acknowledge how he/she should change his/her hitting posture.

Embodiment 3

The following description will discuss another embodiment of the present invention. For convenience of description, a member having a function identical to that of a member discussed in the embodiments above is given an identical reference sign, and a description thereof is omitted.

Figure 11:
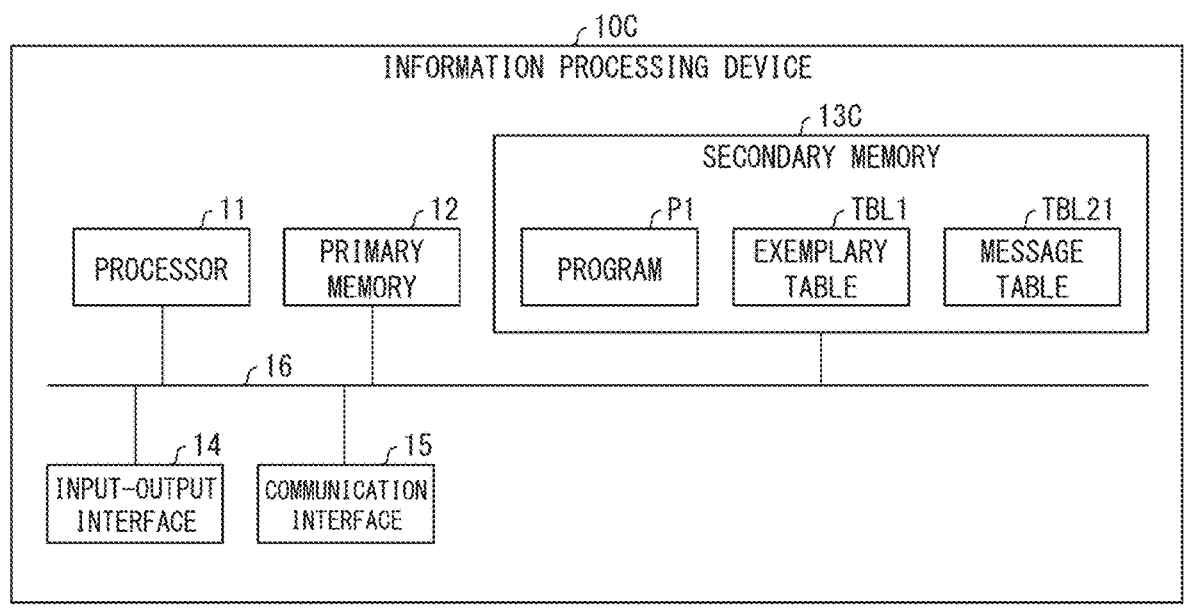
FIG. 11 shows a block diagram illustrating a configuration of an information processing device in accordance with Embodiment 3 of the present invention.

FIG. 11 shows a block diagram illustrating a configuration of an information processing device 10C in accordance with Embodiment 3. The information processing device 10C includes a secondary memory 13C having a message table TBL21 stored therein.

FIG. 12 shows an example of a content of the message table TBL21 stored in the secondary memory 13. The message table TBL21 is a table in which combinations of exemplary postures and evaluation target postures are associated with messages. In the example shown in FIG. 12, the message table TBL21 contains the items "exemplary posture", "evaluation target posture", and "message" which are associated with each other. Out of these items, the item "exemplary posture" stores identification information used to identify the exemplary posture. The item "evaluation target posture" stores identification information used to identify the evaluation target posture.

The item "message" stores a message indicating a change to be made to the batter's hitting posture. The information processing device 10C may display a message for an item for the joint angle that greatly differs between the exemplary posture and the evaluation target posture. The message may be, for example, a message "Do * the * at the impact". For example, in a case where the batter's upper arms are separated away from the body too much relative to the exemplary posture, the information processing device 10C may display the following message: "Keep your upper arm to the body at the impact."

A flow of an information output operation to be executed by a processor 11 of the information processing device 10C in accordance with Embodiment 3 is similar to the flowchart in FIG. 6, which has been explained in Embodiment 1 above. However, the processor 11 of the information processing device 10C in accordance with Embodiment 3 outputs a message different from the message output in the process (the process in step S16 in FIG. 6) of outputting the message in Embodiment 1.

In Embodiment 3, the processor 11 refers to the message table TBL21 to determine, in accordance with the exemplary posture and the evaluation target posture, a message to be output. Specifically, the processor 11 first searches a message table by using, as a key, a combination of the hitting posture determined in step S14 in FIG. 6 and the exemplary posture determined in step S15 in FIG. 6. Then, the processor 11 determines, as the message to be output, a message associated with the key used for the searching. If the hitting posture determined in step S14 is not registered in the message table TBL21, the processor selects, from among the plural hitting postures registered as the evaluation target postures in the message table TBL21, one having a smallest difference from the hitting posture determined. The processor 11 searches the table by using, as a key, a combination of the selected hitting posture and the exemplary posture determined in step S15.

The processor 11 outputs, to the display device 50 and/or the like, a message determined as a result of referring to the message table TBL2. In accordance with the message output to the display device 50 and/or the like, the batter can acknowledge how he/she should change his/her hitting posture.

As described above, in accordance with Embodiment 3, the information processing device 10C refers to the table in which combinations of the exemplary postures and the evaluation target postures are associated with the messages, and outputs a message determined based on the exemplary posture and the evaluation target posture. Consequently, the batter who is practicing batting with a tee can acknowledge how he/she should change his/her hitting posture.

Embodiment 4

The following description will discuss another embodiment of the present invention. For convenience of description, a member having a function identical to that of a member discussed in the embodiments above is given an identical reference sign, and a description thereof is omitted.

An information processing device 10D in accordance with Embodiment 4 has a message table whose content differs from that of the information processing device 10C in accordance with Embodiment 3. FIG. 13 shows one example of a content of a message table TBL22 in accordance with Embodiment 4. The message table TBL22 is a table in which differences between exemplary postures and evaluation target postures are associated with messages. In the example shown in FIG. 13, the message table TBL22 contains the items "difference information" and "message" which are associated with each other. Out of these items, the item "difference information" stores information indicating a difference between the exemplary posture and the evaluation target posture. The item "message" stores a message indicating a change to be made to the batter's hitting posture.

A flow of an information output operation to be executed by a processor 11 of the information processing device 10D in accordance with Embodiment 4 is similar to the flowchart in FIG. 6, which has been explained in Embodiment 1 above. However, in step S16 shown in FIG. 6, the processor 11 of the information processing device 10D in accordance with Embodiment 4 executes a process different from that in Embodiment 1 so as to output a message.

In Embodiment 4, the processor 11 refers to the message table TBL22 to determine, in accordance with the exemplary posture and the evaluation target posture, a message to be output. Specifically, the processor 11 first calculates a difference between the hitting posture determined in step S14 in FIG. 6 and the exemplary posture determined in step S15 in FIG. 6. In an example, the processor 11 calculates differences between the evaluation target posture and the exemplary posture in terms of the plural items, specifically, the angles of the shoulder joint, the elbow joint, the hip joint, and the knee joint of the batter and the gravity center position of the batter, and uses, as difference information, sets of the difference values for the items obtained as a result of the calculation.

Next, the processor 11 uses, as a key, the generated difference information to search the message table TBL22. In a case where the generated difference information is not registered in the message table TBL22, the processor 11 selects, from among the plural hitting postures registered in the message table TBL22, one having a smallest difference from the generated difference information. The processor 11 outputs, to the display device 50 and/or the like, a message associated with the selected difference information.

In accordance with the message output to the display device 50 and/or the like, the batter can acknowledge how he/she should change his/her hitting posture.

As described above, in accordance with Embodiment 4, the information processing device 10D refers to the table in which the differences between the exemplary postures and the evaluation target postures are associated with the messages, and outputs a message determined based on the exemplary posture and the evaluation target posture. Consequently, the batter who is practicing batting with a tee can acknowledge how he/she should change his/her hitting posture.

Embodiment 5

The following description will discuss another embodiment of the present invention. For convenience of description, a member having a function identical to that of a member discussed in the embodiments above is given an identical reference sign, and a description thereof is omitted.

An information processing device 10E in accordance with Embodiment 5 carries out a process (the process in step S16 in FIG. 6) of selecting a message in a different manner from that of the information processing device 10 in accordance with Embodiment 1 described above. An information processing method to be executed by the information processing device 10E in accordance with Embodiment 5 will be referred to as an information processing method M4.

Figure 14:
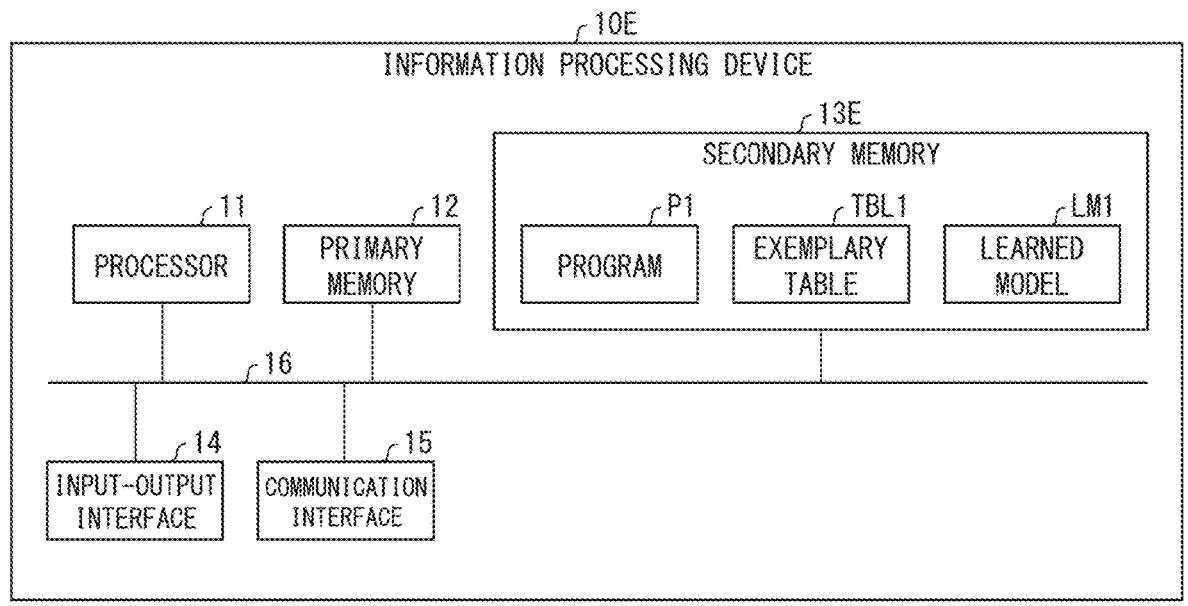
FIG. 14 shows a block diagram illustrating a configuration of an information processing device in accordance with Embodiment 5 of the present invention.

FIG. 14 shows a block diagram illustrating a configuration of an information processing device 10E in accordance with Embodiment 5. The information processing device 10E includes a secondary memory 13E having a learned model LM1 stored therein. A processor 11 loads, on a primary memory 12, the learned model LM1 stored in the secondary memory 13D. The learned model LM1 loaded on the primary memory 12 is used by the processor 11 when the processor 11 executes a process of outputting a message. Note that a state in which the learned model LM1 is stored in the secondary memory 13 means a state in which parameters defining the learned model LM1 are stored in the secondary memory 13.

Embodiment 5 employs a configuration in which the learned model LM1 is stored in a memory (secondary memory 13) contained in a computer in which a processor (processor 11) that executes the information processing method M4 is contained. However, the present invention is not limited to this. That is, the present invention may employ a configuration in which the learned model LM1 is stored in a memory contained in a computer that is not the computer in which the processor that executes the information processing method M4 is contained. In this case, the computer containing the memory storing the learned model LM1 is connected, over a network, to the computer containing the processor that executes the information processing method M4 so that the computers are communicable with each other. For example, the following configuration can be employed: the learned model LM1 is stored in a memory contained in a computer constituting a cloud server and a processor contained in a computer owned by a user of the cloud server executes the information processing method M4.

Note that, although Embodiment 5 employs a configuration in which the learned model LM1 is stored in a single memory (secondary memory 13), the present invention is not limited to this. That is, the following configuration may be employed: the learned model LM1 is divided into plural parts and stored in respective plural memories. In this case, the plural memories in which the parts of the learned model LM1 are stored may be provided in a single computer (which may be or may not be the computer in which the processor that executes the information processing method M4 is contained) or in respective plural computers (which may or may not include the computer storing the processor that executes the information processing method M4). For example, the following configuration can be employed: the learned model LM1 is divided into plural parts and stored in respective plural memories contained in respective plural computers constituting a cloud server.

The learned model LM1 is a learned model constructed by machine learning in which a combination of an exemplary posture and an evaluation target posture is an input and a message is an output. Examples of the learned model LM1 include algorithms such as neural network models (e.g., convolutional neural network and recurrent neural network), regression models (e.g., linear regression), and tree models (e.g., regression tree).

Figure 15:
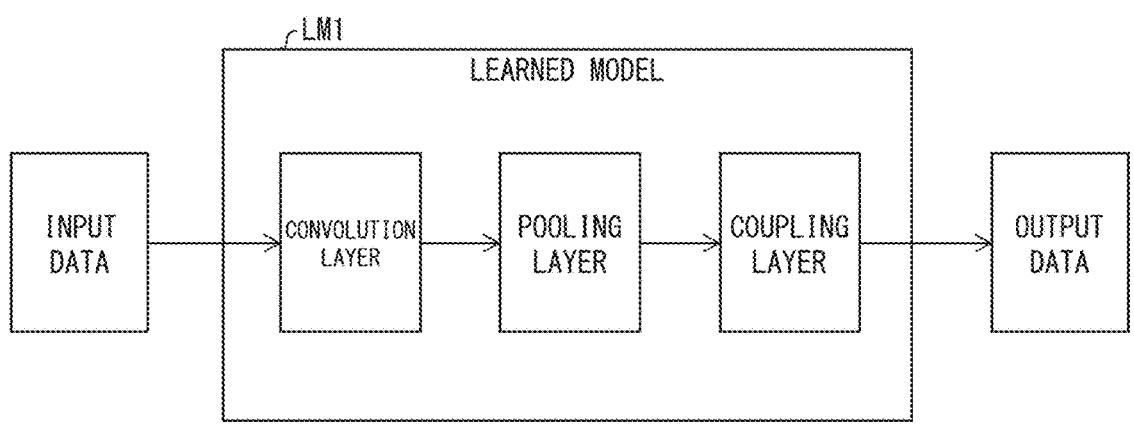
FIG. 15 schematically shows one example of a learned model in accordance with Embodiment 5 of the present invention.

FIG. 15 schematically shows one example of the learned model LM1 in accordance with Embodiment 5. As shown in FIG. 15, input data is input to the learned model LM1. The learned model LM1 is constituted by, e.g., a convolution layer, a pooling layer, and a coupling layer. In the convolution layer, the input data is filtered so that the information is convoluted. The data thus convoluted is input to the pooling layer so as to be subjected to pooling. This enhances recognition performance of the model with respect to a positional change of a feature in the data. The data having been subjected to the pooling is processed in the coupling layer so as to be converted into output data of the learned model LM1, i.e., a label used to determine a message, and then is output.

Specifically, the input data input to the learned model LM1 is caused to pass through the layers shown in FIG. 15 in this order, whereby the estimation result of the message is output. Note that the output form of the estimation result is not limited to any particular one. For example, the message may be indicated in the form of text data.

A flow of an information output operation to be executed by a processor 11 of the information processing device 10E in accordance with Embodiment 5 is similar to the flowchart in FIG. 6, which has been explained in Embodiment 1 above. However, in step S16 shown in FIG. 6, the processor 11 of the information processing device 10E in accordance with Embodiment 5 executes a process different from that in Embodiment 1.

In Embodiment 5, the processor 11 uses the learned model LM1 to determine a message to be output. In other words, the processor 11 inputs, to the learned model LM1, a combination of an exemplary posture and an evaluation target posture, and outputs, to a display device 50 and/or the like, a message corresponding to a label output from the learned model LM1.

(Generation of Teaching Data and Construction of Learned Model)

Next, the following description will discuss an operation of constructing the learned model LM1 and an operation of generating teaching data used in the constructing process. In Embodiment 5, the information processing device 10E executes the process of constructing the learned model LM1 and the process of generating the teaching data. The process of constructing the learned model LM1 and the process of generating the teaching data may be executed by a device other than the information processing device 10E.

The teaching data used to construct the learned model LM1 includes a set of an evaluation target posture and an exemplary posture and a label indicating a type of a message.

The processor 11 first obtains an evaluation target posture and an exemplary posture associated with the evaluation target posture. In an example, the processor 11 obtains the evaluation target posture and the exemplary posture from the input device, other device(s), and/or the like via an input-output interface 14 or a communication interface 15. The processor 11 then associates the obtained evaluation target posture and exemplary posture with a label, so as to generate teaching data. The label is data indicating the type of the message. The label is input to the information processing device 10E via the input-output interface 14, for example.

The processor 11 constructs the learned model LM1 by supervised learning with teaching data. Examples of the learned model LM1 include algorithms such as neural network models (e.g., convolutional neural network and recurrent neural network), regression models (e.g., linear regression), and tree models (e.g., regression tree).

In accordance with Embodiment 5, the information processing device 10E uses the learned model LM1 to determine a message to be output, the learned model LM1 being constructed by machine learning in which a combination of an exemplary posture and an evaluation target posture is an input and a message is an output. Consequently, the batter who is practicing batting with a tee can acknowledge how he/she should change his/her hitting posture.

Embodiment 6

The following description will discuss another embodiment of the present invention. For convenience of description, a member having a function identical to that of a member discussed in the embodiments above is given an identical reference sign, and a description thereof is omitted.

Figure 16:
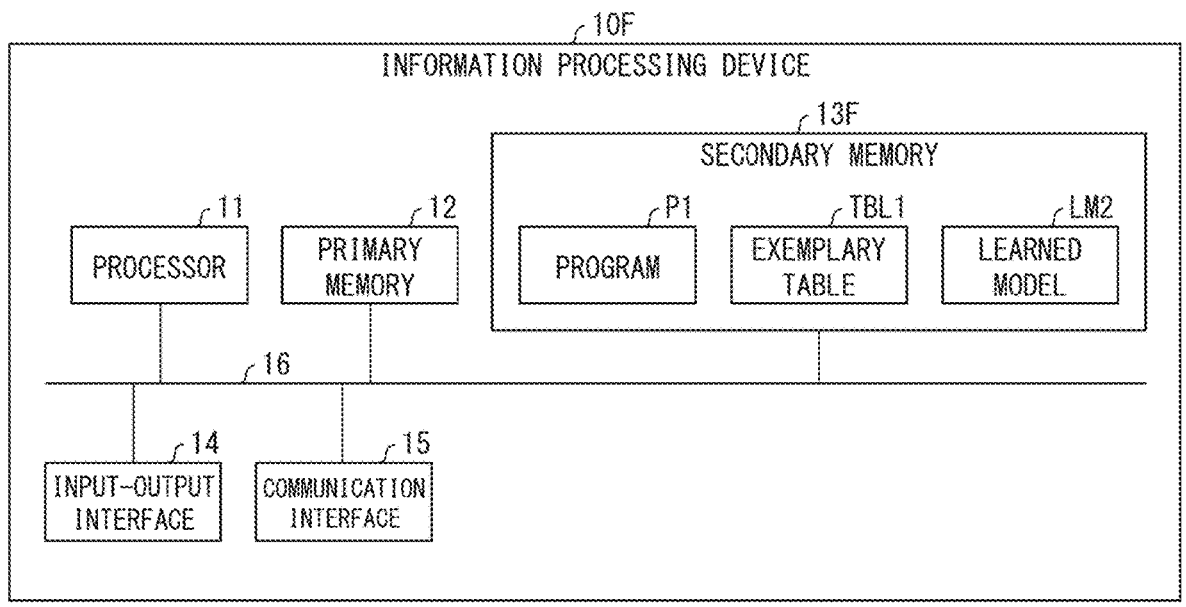
FIG. 16 shows a block diagram illustrating a configuration of an information processing device in accordance with Embodiment 6 of the present invention.

FIG. 16 shows a block diagram illustrating a configuration of an information processing device 10F in accordance with Embodiment 6. The information processing device 10F includes a secondary memory 13F having a learned model LM2 stored therein. A processor 11 loads, on a primary memory 12, the learned model LM2 stored in the secondary memory 13F. The learned model LM2 loaded on the primary memory 12 is used by the processor 11 when the processor executes a process of outputting a message.

The learned model LM2 is a learned model constructed by machine learning in which a difference between an exemplary posture and an evaluation target posture is an input and a message is an output. Examples of the learned model LM2 include algorithms such as neural network models (e.g., convolutional neural network and recurrent neural network), regression models (e.g., linear regression), and tree models (e.g., regression tree).

A flow of an information output operation to be executed by the processor 11 of the information processing device 10F in accordance with Embodiment 6 is similar to the flowchart in FIG. 6, which has been explained in Embodiment 1 above. However, in step S16 shown in FIG. 6, the processor 11 of the information processing device 10F in accordance with Embodiment 6 executes a process different from that in Embodiment 1.

In Embodiment 6, the processor 11 uses the learned model LM2 to determine a message to be output. Specifically, the processor 11 first calculates a difference between the hitting posture determined in step S14 in FIG. 6 and the exemplary posture determined in step S15 in FIG. 6. In an example, the processor 11 calculates differences between the evaluation target posture and the exemplary posture in terms of the plural items, specifically, the angles of the shoulder joint, the elbow joint, the hip joint, and the knee joint of the batter and the gravity center position of the batter, and uses, as difference information, sets of the difference values for the items obtained as a result of the calculation.

Next, the processor 11 inputs the generated difference information to the learned model LM2, and outputs, to a display device and/or the like, a message associated with a label output from the learned model LM2. In accordance with Embodiment 6, the information processing device 10F uses the learned model LM2 to determine a message to be output, the learned model LM2 being constructed by machine learning in which a difference between an exemplary posture and an evaluation target posture is an input and a message is an output. Consequently, the batter who is practicing batting with a tee can acknowledge how he/she should change his/her hitting posture.

Embodiment 7

The following description will discuss another embodiment of the present invention. For convenience of description, a member having a function identical to that of a member discussed in the embodiments above is given an identical reference sign, and a description thereof is omitted.

In Embodiment 1 described above, the information processing device 10 refers to the exemplary table TBL1 to determine the exemplary posture that is used as a reference for comparison with the evaluation target posture (step S15 in FIG. 6). Meanwhile, an information processing device 10G in accordance with Embodiment 7 uses a learned model LM3 to determine an exemplary posture.

The learned model LM3 is a learned model constructed by machine learning in which either or both of a physical characteristic and an evaluation target posture of a batter is/are an input and a label for identification of an exemplary posture is an output. Examples of the learned model LM3 include algorithms such as neural network models (e.g., convolutional neural network and recurrent neural network), regression models (e.g., linear regression), and tree models (e.g., regression tree).

A flow of an information output operation to be executed by a processor 11 of the information processing device 10G in accordance with Embodiment 7 is similar to the flowchart in FIG. 6, which has been explained in Embodiment 1 above. However, in the process for determining the exemplary posture in step S15 shown in FIG. 6, the processor 11 of the information processing device 10G in accordance with Embodiment 7 executes a process different from that in Embodiment 1.

In Embodiment 7, the processor 11 uses the learned model LM3 to determine an exemplary posture. In other words, the processor 11 inputs either or both of the physical characteristic and the evaluation target posture of the batter to the learned model LM3, and determines, as the exemplary posture to be used as a reference of comparison, the exemplary posture associated with the label output from the learned model LM3.

The input data of the learned model LM3 is not limited to the information indicating the physical characteristic of the batter and the information indicating the evaluation target posture of the batter, and may include another information. In an example, the input data of the learned model LM3 may include time-series data indicating the posture of the batter measured in a given period including a period prior to a ball hitting timing of the batter and a period following the ball hitting timing.

Teaching data used to construct the learned model LM3 includes either or both of the physical characteristic and the evaluation target posture and the label indicating the exemplary posture. In a learning phase, the processor 11 first obtains the information indicating the physical characteristic of the batter and the information indicating the evaluation target posture of the batter. In an example, the processor 11 obtains these pieces of information from the input device, other device(s), and/or the like via an input-output interface 14 or a communication interface 15. The processor 11 then associates the set of the obtained pieces of information with a label, so as to generate teaching data. The label is identification information used to identify the exemplary posture. The label is input to the information processing device 10G via the input-output interface 14, for example.

The processor 11 constructs the learned model LM3 by supervised learning with teaching data. Examples of the learned model LM3 include algorithms such as neural network models (e.g., convolutional neural network and recurrent neural network), regression models (e.g., linear regression), and tree models (e.g., regression tree).

(Additional Remarks 1)

The processes discussed in the embodiments above may be executed by artificial intelligence (AI). In this case, AI may be operated in the control device or another device (e.g., an edge computer or a cloud server).

(Additional Remarks 2)

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 10, 10C, 10D, 10E, 10F, 10G: Information processing device
11: Processor
20: Force sensor
30: Motion sensor
40: Force plate
M1, M4: Information processing method

The invention claimed is:

1. A device comprising:
a plurality of markers attachable to a batter;
at least one motion sensor configured to detect the plurality of markers;
a first memory having instructions stored thereon;
a secondary memory including physical characteristics of a batter and exemplary postures; and
one or more processors;
configured to execute the instructions to:
continuously measure, in accordance with either or both of an output signal from the at least one motion sensor and an output signal from a force plate, a posture of a batter who is practicing batting with a tee;

determine, in accordance with an output signal from a force sensor internally stored in the tee, a timing at which the batter hits a ball placed at the tee, the one or more processors configured to determine that the batter hits the ball when at least one of an amount of change in a force applied to the tee or a torque applied to the tee exceeds a given threshold;

determine, in accordance with an output signal from the at least one motion sensor, as a hitting posture of the batter, a posture of the batter at the timing determined in the timing determining process; and output a message instructing the batter to change the hitting posture of the batter, in accordance with information indicating an exemplary hitting posture corresponding to a physical characteristic of the batter stored in the secondary memory and with information indicating the hitting posture of the batter determined in the posture determining process.

2. The device as set forth in claim 1, wherein the one or more processors are further configured to output, a message indicating a difference between the exemplary hitting posture and the hitting posture of the batter determined in the posture determining process.

3. The device as set forth in claim 1, wherein the exemplary hitting posture is an exemplary posture and the hitting posture to be evaluated is an evaluation target posture, and the one or more processors are further configured to refer to a table stored in the secondary memory in which a combination of the exemplary posture and the evaluation target posture or a difference between the exemplary posture and the evaluation target posture is associated with the message to determine, in accordance with the exemplary posture and the evaluation target posture, a message to be output.

4. The device as set forth in claim 1, wherein the exemplary hitting posture is an exemplary posture and the hitting posture to be evaluated is an evaluation target posture, and the one or more processors are further configured to use a learned model to determine a message to be output, the learned model being constructed by machine learning in which a combination of the exemplary posture and the evaluation target posture or a difference between the exemplary posture and the evaluation target posture is an input and the message is an output.

5. The device as set forth in claim 1, wherein information indicating the posture includes a part or all of angles of a shoulder joint, an elbow joint, a hip joint, and a knee joint of the batter and a gravity center position of the batter determined by detecting the plurality of markers.

6. A method:

one or more processors continuously measuring, in accordance with either or both of an output signal from a motion sensor and an output signal from a force plate, a posture of a batter who is practicing batting with a tee;

the one or more processors determining, in accordance with an output signal from a force sensor internally stored in the tee, a timing at which the batter hits a ball placed at the tee, wherein the determining of the timing determines that the batter hits the ball when at least one of an amount of change in a force applied to the tee or a torque applied to the tee exceeds a given threshold;

the one or more processors determining, as a hitting posture of the batter, a posture of the batter at the timing determined in the determining of the timing based on an output signal from the motion sensor; and the one or more processors outputting a message instructing the batter to change the hitting posture of the batter, in accordance with information indicating an exemplary hitting posture corresponding to a physical characteristic of the batter stored in a memory and with information indicating the hitting posture of the batter determined in the determining the posture.

7. A non-transitory computer readable medium storing instructions, when executed by a computer, causes the computer to:

continuously measuring, in accordance with either or both of an output signal from a motion sensor and an output signal from a force plate, a posture of a batter who is practicing batting with a tee;

determining, in accordance with an output signal from a force sensor internally stored in the tee, a timing at which the batter hits a ball placed at the tee, wherein the determining of the timing determines that the batter hits the ball when at least one of an amount of change in a force applied to the tee or a torque applied to the tee exceeds a given threshold;

determining, as a hitting posture of the batter, a posture of the batter at the timing determined in the determining of the timing based on an output signal from the motion sensor; and outputting a message instructing the batter to change the hitting posture of the batter, in accordance with information indicating an exemplary hitting posture corresponding to a physical characteristic of the batter stored in a memory and with information indicating the hitting posture of the batter determined in the determining the posture.

* * * * *